United States Patent [19]

Schroeder

[11] 3,780,839
[45] Dec. 25, 1973

[54] INTERLOCK FOR TRANSMISSION AND PARKING BRAKE CONTROLS
[75] Inventor: Kenneth Roger Schroeder, Holy Cross, Iowa
[73] Assignee: Deere & Company, Moline, Ill.
[22] Filed: Nov. 10, 1972
[21] Appl. No.: 305,474

[52] U.S. Cl............. 192/4 A, 192/4 R, 74/471 R, 74/473 R
[51] Int. Cl............................................ F16d 67/00
[58] Field of Search........................... 192/4 R, 4 A; 74/471 R, 473 R

[56] References Cited
UNITED STATES PATENTS
3,242,758  3/1966  Harris et al..................... 74/476
2,975,651  3/1961  Fox et al........................ 192/4 A X
2,988,185  6/1961  Pond................................ 192/4 A
1,906,571  5/1933  Gilmore........................... 192/4 A Primary Examiner—Manuel A. Antonakas
Assistant Examiner—Lance W. Chandler
Attorney—H. Vincent Harsha et al.

[57] ABSTRACT

The control linkages for a change-speed transmission and a parking brake have interlocking parts which lock the transmission in neutral either when the transmission is in neutral and the parking brake is then engaged or when the parking brake is applied and the transmission is then shifted into neutral.

5 Claims, 1 Drawing Figure

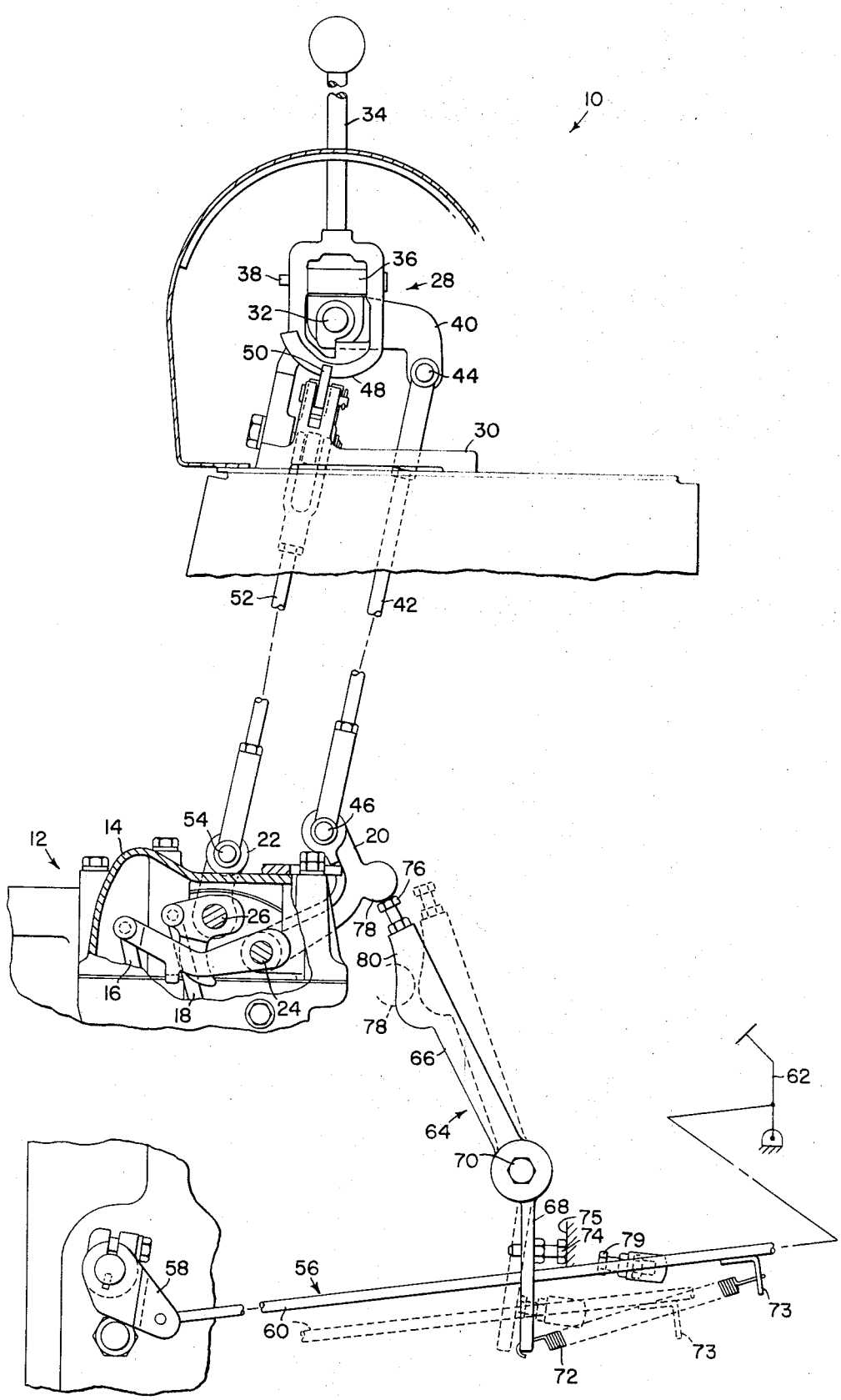

INTERLOCK FOR TRANSMISSION AND PARKING BRAKE CONTROLS

BACKGROUND OF THE INVENTION

This invention relates to means for interlocking a change-speed transmission control and a parking brake control in such a manner as to prevent the transmission control from being shifted from neutral when the parking brake is engaged.

The present invention represents a variation of the design disclosed in U. S. Pat. No. 3,242,758 granted to Harris et al. on Mar. 29, 1966. In the design disclosed by the Harris et al patent, a single shift lever is provided for controlling a pair of hydraulic valves for effecting both speed and direction changes in a hydraulically controllable transmission. The shift lever also controls a parking lock brake, the actuation of which is interlocked with the operation of the pair of hydraulic valves such that the parking lock cannot be engaged while the transmission is in a speed condition. Further, the interlock prevents the transmission from being placed in a speed condition when the control lever is located in the parking lock effecting position.

Since the parking lock in the Harris et al. design cannot be engaged while the transmission is in a speed condition, the parking lock cannot be used as an emergency brake.

SUMMARY OF THE INVENTION

Accordingly, it is an object of the present invention to provide a transmission and parking brake control interlock which permits the parking brake control to be operated to effectuate the engagement of the parking brake when the transmission control is in a position effectuating a drive condition in the transmission.

Another object is to provide an interlock including a pivotal interlock member which is resiliently connected to a link of the parking brake control, the resilient connection being a spring which is loaded to bias the interlock member towards a position for preventing the transmission control from being shifted from its neutral position when the parking brake is engaged.

Still another object is to provide an adjustable abutment carried by the parking brake control to engage and positively move the interlock member out of blocking relationship relative to the transmission control when the parking brake control is shifted to disengage the parking brake.

Yet another object is to provide an interlock wherein the interlock member cooperates with a pivotally mounted controller or link of the transmission control and includes an abutment surface which is formed on a radius extending from the center of rotation of the controller whereby wear caused by frictional engagement of the interlock member with the controller will be minimized.

These and other objects will become apparent from consideration of the following description and the appended drawing.

BRIEF DESCRIPTION OF THE DRAWING

The sole FIGURE is a longitudinal composite sectional view of the interlocked transmission and parking brake controls constructed according to the principles of the present invention.

DESCRIPTION OF THE PREFERRED EMBODIMENT

Referring now to the drawing, therein is shown an interlocked transmission and parking brake control mechanism indicated in its entirety by the reference numeral 10. In the embodiment shown, the control mechanism 10 is constructed so as to be particularly suitable for controlling a transmission and a parking brake lock of the type disclosed in, and in the manner disclosed in, the aforementioned Harris et al. patent.

The control mechanism 10 includes a transmission control valve 12 comprising a valve body or housing 14 having first and second spool valve members (not shown) reciprocably mounted therein for selected movement to preselected axial positions for controlling the speed and direction of a transmission in the manner disclosed in the aforementioned Harris et al. patent. Respectively pivotally connected to the upper ends of the first and second spool valve members are first and second valve rods 16 and 18 which in turn have their upper ends respectively pivotally connected to the ends of one of the arms of a pair of bell cranks or valve controllers 20 and 22. The bell cranks 20 and 22 are respectively pivotally mounted on parallel transverse shafts 24 and 26 which are located in the housing 14. When the bell cranks 20 and 22 are positioned as shown in solid lines in the drawing, they are in neutral positions and a corresponding neutral condition is effected in the transmission. Eight different speed conditions may be established in the transmission by rotating the controller 20 clockwise from the position shown through approximately 45°, the respective speed positions being substantially evenly spaced from one another. Forward and reverse driving conditions may be established in the transmission by swinging the crank arm 22 respectively counterclockwise and clockwise from the position shown.

For the purpose of selectively swinging the controllers 20 and 22, there is provided a shifter assembly 28. The shifter assembly is mounted on a tractor support 30 and includes a fixed pivot shaft 32 that establishes a transverse pivot axis for mounting a control lever unit comprising a lever 34 and a lever mounting member 36. The arrangement is such that the lever 34 projects outwardly through and is guided by a shift pattern (not shown), the lever being in this case somewhat in the nature of a radius as respects the transverse axis of the pivot shaft 32. The mounting member 36 is in the form of a block loosely mounted on the shaft 32 and therefore is freely rockable about the axis of the shaft. The connection between the lever 34 and the block 36 is established by a pin 38 which lies in a longitudinal or fore-and-aft plane; at least, a plane that intersects the axis of the shaft 32 at a right angle. For present purposes, the axis of the pivot pin 38 may be considered fore and aft, even though it includes somewhat upwardly and forwardly, depending upon the position of the lever 34 relative to the front and rear limits established by the shift pattern. The lower end of the lever has a box-like portion which closely embraces the mounting block 36. Because of this configuration, the lever and block are interconnected for fore-and-aft rocking of the block about the shaft 32; yet, the lever itself is rockable laterally about the pivot pin 38. Integral with the mounting member 36 is a rearwardly and downwardly curved arm 40 to which the upper end of a motion-transmitting link 42 is connected as at a pin 44, the lower end of the motion-transmitting link being connected to the valve controller 20 as at a pin 46.

The lower part of the box-like portion of the lever 34 is in the form of an arc or track 48 which runs in a notch or slot in a laterally shiftable member 50. One end of the member 50 is connected to the support 30 through means of a pin and slot connection (not shown) while the other end of the member 50 is pivotally connected to one arm of a bell crank (not shown), the other end of the bell crank being pivotally connected to the top of a motion-transmitting link 52. The bottom of the link 52 is pivotally connected to the valve controller 22 as at a pin 54.

Thus, it will be appreciated that when the lever 34 is swung to the right as viewed in the drawing, the mounting member or block 36 will be rotated clockwise about the shaft 32 to cause the motion-transmitting link 42 to be moved downwardly to in turn cause the controller 20 to be swung clockwise. Also, it will be appreciated that sideways movement of the lever 34 about the pin 38 will cause the member 50 to be shifted laterally to in turn rotate the bell crank (not shown) either clockwise or counterclockwise to thus cause the motion-transmitting link 52 to be shifted either downwardly or upwardly to cause displacement of the controller 22 either clockwise or counterclockwise respectively.

It is noted that the above-described transmission control valve 12 and the shifter assembly 28 are similar to structure shown in more detail in the Harris et al. patent and that reference may be had to that patent for these details if desired.

A parking brake control assembly 56 is provided for selectively engaging and disengaging a parking pawl (not shown) of the type disclosed in the aforementioned Harris et al. patent, respectively, with and from a gear of the transmission. The parking pawl is actuated through means of a cam-carrying crank arm 58 to which is connected one end of a motion-transmitting link 60 having its other end connected to a foot pedal 62 through means of a linkage (not shown).

For the purpose of correlating the positions of the shifter assembly 28 and the parking brake control assembly 56, there is provided an interlock member or bell crank 64 including upper and lower arms 66 and 68 respectively. Located at the vertex of the angle formed by the arms 66 and 68 is a pivot pin 70 which pivotally connects the interlock member 64 to support means such as a vehicle transmission housing. The motion-transmitting link 58 of the parking brake control assembly and the interlock member 64 are interconnected through means of an extension coil spring 72 having its opposite ends respectively connected at the lower end of the lower arm 68 and a bracket 73 fixed to the motion-transmitting link. The foot pedal 62 and the motion-transmitting link 60 are shown, in solid lines, in a brake-engaging position wherein the crank arm 60 is in its extreme counterclockwise position and effects locking engagement of the parking pawl (not shown) with a gear of the transmission. When the motion-transmitting link 60 is in the brake-engaging position, the extension spring 72 is tensioned and acts to bias the interlock member 64 counterclockwise about the pivot 70. When the shift lever 34 is in the neutral position shown, the interlock member 64 will be in its extreme counterclockwise position wherein an adjustable abutment surface 74 in the form of a set screw located between the pivot 70 and the lower end of the lower arm 68 will engage the transmission housing as at 75 and wherein an adjustable abutment 76 at the upper end of the upper arm 66 is in the path of movement of and is blockingly engaged with an abutment surface 78 formed on the valve controller 20. Thus, it will be appreciated that once the control mechanism 10 is in the condition illustrated in solid lines in the drawing, the transmission cannot be shifted from its neutral position unless the parking brake is first released.

When the pedal 62 is actuated to its release position, the motion-transmitting brake 60 will move generally lengthwise to a brake-releasing position, shown in dashed lines in the drawing, and during this movement an adjustable abutment 79 in the form of a set screw located in a bracket fixed to the motion-transmitting link will be brought into engagement with the lower arm of the interlock member 64 to positively swing the interlock member 64 to an extreme clockwise disengaged position wherein it is located completely out of the path of swinging movement of the valve controller 20.

Should it become necessary to make an emergency stop while the transmission is in a driving condition, for example, as would be effected when the shift lever is located in an extreme clockwise position with the valve controller 20 then also being in an extreme clockwise position with the abutment surface 78 being disposed as shown in dashed lines, such as emergency stop may be made by actuating foot pedal 62 to cause the motion-transmitting link 60 to be moved to the solid line position shown in the drawing. As before, the tension spring 72 will act to bias the interlock member 64 clockwise; however, now the abutment surface 78 will engage a forward arcuate surface 80 formed on the forward side of the upper arm 66 of the interlock member. It is noted that when the interlock member 64 is located in its released dashed line position shown, the arcuate surface is concentric with the pivot shaft 24 and thus extends parallel to the path of movement of the abutment surface 78. Thus, when the surface is in engagement with the abutment surface 78, the frictional resistance to the movement of the valve controller 20 will be minimized. Return of the shift lever 34 to its neutral position shown while the parking brake is engaged will result in the interlock member 64 moving into its engaged blocking position shown in solid lines in the drawing once the abutment surface 78 has moved counterclockwise far enough to permit the adjustable abutment 76 at the end of the upper arm 66 to pass thereby.

The foregoing description is thought to include a sufficient description of the operation and no further description is given for the sake of brevity.

I claim:

1. In a vehicle having a parking brake apparatus actuatable between brake-engaging and brake-releasing conditions and a change-speed transmission shiftable between neutral and drive-establishing conditions, the combination comprising: transmission control means including a controller mounted for pivotal swinging movement between a neutral and a drive-establishing position to respectively effect the neutral and drive-establishing conditions of the transmission; a brake control means including a substantially linearly shiftable link movable between brake-engaging and brake-releasing positions to respectively effect the brake-engaging and brake-releasing conditions in said brake apparatus; and interlock means being connected between said controller and said link for blocking said controller in said neutral position both when the controller is in said neutral position and said link is thereafter moved to said brake-engaging position and said controller is thereafter pivoted to said neutral position.

2. The vehicle defined in claim 1 wherein said controller has a portion defining a first contact surface; said interlock means including a pivotally mounted arm having a portion defining a second contact surface; said arm being swingable between unblocking and blocking positions respectively wherein said second contact surface is disposed out of the path of movement of said controller and in the path of movement of and in bearing engagement with said first contact surface and connecting means joining said arm with said link for effecting movement of said arm from said unblocking position to said blocking position respectively as the link is moved from said brake-releasing position to said brake-engaging position.

3. The vehicle defined in claim 2 wherein said connecting means includes biasing means connected between said arm and link and being responsive to the movement of said link toward said brake-engaging position for biasing said arm toward said blocking position.

4. The vehicle defined in claim 3 wherein said arm has a portion defining a third contact surface which is formed on a radius having the center of rotation of said controller as its center when the arm is in said unblocking position, said third contact surface then being adjacent to and paralleling the path of movement of a fourth contact surface defined by a portion of said controller; and said biasing means acting to effect engagement between said third and fourth contact surfaces when the controller is in said drive-establishing position and said link is moved from brake-releasing position toward said brake-engaging position, the biasing means then being conditioned for effecting movement of said arm to said blocking position when the controller is moved to said neutral position.

5. The vehicle defined in claim 4 wherein said interlocking means includes adjustable abutment means carried by said link and being disposed to contact said arm for causing the latter to be rotated to said unblocking position when said link is moved to said brake-releasing position.

* * * * *